Figure 1:
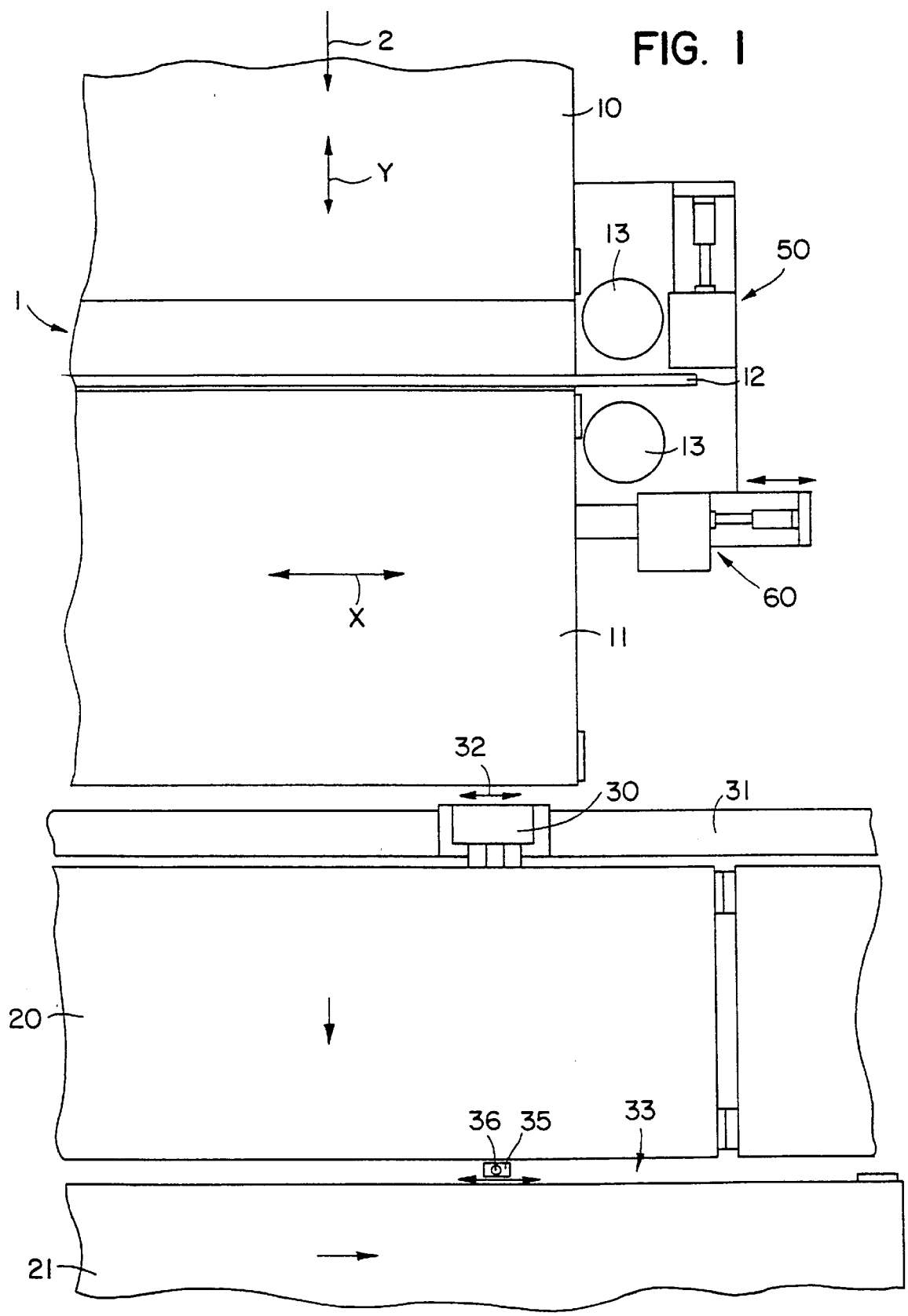

United States Patent
Lisec

[19]

[11] Patent Number: 5,857,603
[45] Date of Patent: *Jan. 12, 1999

[54] PROCESS AND APPARATUS FOR DIVIDING GLASS SHEETS INTO CUTS

[76] Inventor: Peter Lisec, Bahnhofstrasse 34, A-3363 Amstetten-Hausmening, Austria

[*] Notice: This patent issued on a continued prosecution application filed under 37 CFR 1.53(d), and is subject to the twenty year patent term provisions of 35 U.S.C. 154(a)(2).

[21] Appl. No.: 822,976

[22] Filed: Mar. 21, 1997

Related U.S. Application Data

[63] Continuation of Ser. No. 612,079, Mar. 7, 1996, abandoned, which is a continuation of Ser. No. 414,054, Mar. 30, 1995, abandoned, which is a continuation of Ser. No. 45,231, Mar. 23, 1993, abandoned.

[30] Foreign Application Priority Data

Apr. 6, 1992 [AT] Austria ................................ 715/92

[51] Int. Cl.$^6$ ....................................................... B26F 3/00
[52] U.S. Cl. ................................ 225/2; 225/4; 225/96.5
[58] Field of Search ........................... 225/2, 3, 4, 96.5, 225/97, 103, 104, 105

[56] References Cited

U.S. PATENT DOCUMENTS

| | | | |
|---|---|---|---|
| 444,345 | 4/1891 | Solomon et al. | 225/96.5 |
| 2,591,828 | 10/1952 | Judd, Jr. | 49/48 |
| 2,948,991 | 8/1960 | Walters et al. | |
| 3,253,756 | 5/1966 | Haley et al. | |
| 3,259,286 | 7/1966 | Gras | 225/2 |
| 3,286,893 | 11/1966 | Zellers, Jr. | 225/2 |
| 3,486,673 | 12/1969 | Madge | 225/2 |
| 3,543,978 | 12/1970 | Feillet | 225/2 |
| 3,570,734 | 3/1971 | Allen | |
| 3,668,955 | 6/1972 | Rupprecht et al. | |
| 3,693,852 | 9/1972 | Simomura | |
| 3,979,243 | 9/1976 | De Torre | |
| 4,109,841 | 8/1978 | DeTorre | |
| 4,306,672 | 12/1981 | Johannes | 225/97 |
| 4,454,972 | 6/1984 | Maltby, Jr. et al. | |
| 5,040,342 | 8/1991 | McGuire et al. | |

FOREIGN PATENT DOCUMENTS

| | | |
|---|---|---|
| 0192920 | 9/1986 | European Pat. Off. |
| 0340199 | 11/1989 | European Pat. Off. |
| 0457751 | 11/1991 | European Pat. Off. |
| 0477163 | 3/1992 | European Pat. Off. |
| 2484393 | 12/1981 | France |
| 1813673 | 7/1969 | Germany |
| 1957601 | 6/1970 | Germany |
| 2518243 | 11/1975 | Germany |
| 2918331 | 11/1980 | Germany |
| 3428863 | 2/1986 | Germany |
| 3906292 | 11/1989 | Germany |
| 4123929 | 1/1993 | Germany |

OTHER PUBLICATIONS

"Glasschneideanlagen mit automatischer Beschickung", Austrian Glazer's News, Apr. 1972, pp. 19–21.

Primary Examiner—Kenneth E. Peterson
Attorney, Agent, or Firm—Young & Thompson

[57] ABSTRACT

A lifting bar (12) for breaking scored glass sheets along score lines extending in the X direction and a device (30) for breaking the glass sheets along score lines extending in the Y direction are provided at a glass breaking table (1), conveyor belts (10, 11, 20, 21) being included in order to move the scored and/or partially broken glass sheets to the various locations of the glass breaking table (1). Additionally, rim snap-off tools (50 and 60) are associated with the glass breaking table (1), these tools breaking off marginal strips located outside of score lines corresponding to zero lines from the glass sheet by twisting these marginal strips with respect to the glass sheet. The procedure herein is such that first the marginal strips extending in the X direction are broken off by the rim snap-off tool (50) before the glass sheet is broken along the score lines extending in the X direction. Then, from the individual thus-obtained glass strips, the further marginal strips located along the zero score lines extending in the Y direction are broken off by rim snap-off tools (60). Only thereafter are the glass strips divided into the desired glass cuts along the score lines extending in the Y direction and are carried away by the conveyor belt (21) of the glass breaking table (1).

3 Claims, 7 Drawing Sheets

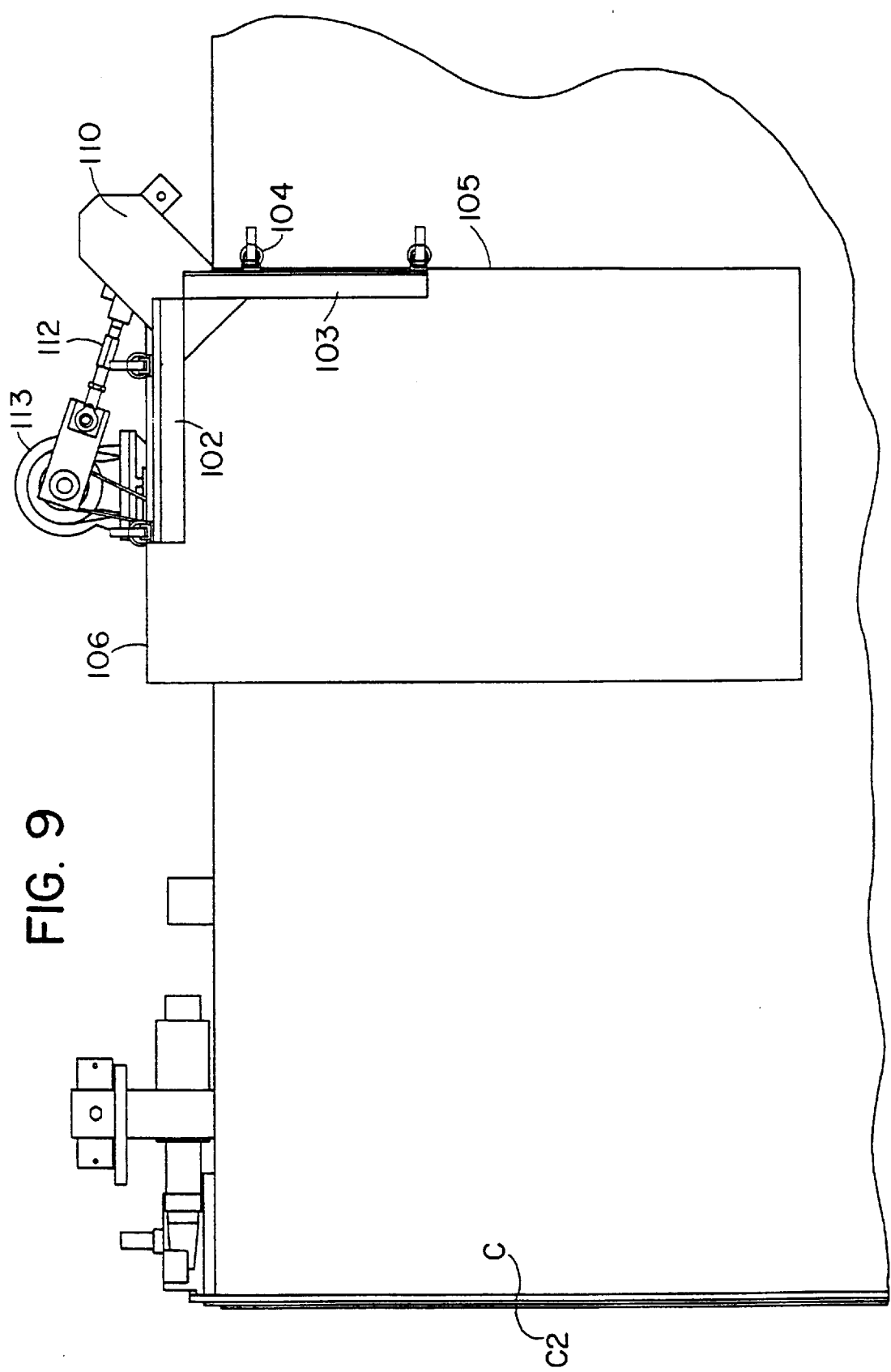

PROCESS AND APPARATUS FOR DIVIDING GLASS SHEETS INTO CUTS

This application is a continuation of application Ser. No. 08/612,079, filed Mar. 7, 1996, now abandoned, which is a continuation of application Ser. No. 08/414,054, filed Mar. 30, 1995, abandoned, which is a continuation of application Ser. No. 08/045,231, filed Mar. 23, 1993, now abandoned.

The invention relates to a process and an apparatus for dividing glass sheets into cuts of the desired shape and size.

Glass cutting tables have been known in various designs. Attention can be invited, in this connection, to EP-A-457,751, German Patent 3,906,292, DOS 1,957,601, U.S. Pat. No. 3,979,243, and the article "Glass Cutting Facilities . . ." in "Oesterr. Glaserzeitung" [Austrian Glazer's News] issue April 1972, pages 19–21.

Besides the glass cutting tables wherein the glass sheets are scored in correspondence with the shape and size of the desired cuts, devices are also known for breaking glass sheets unilaterally scored on glass cutting tables (so-called "breaking tables) on which the glass sheets are divided along the score lines with the aid of lifting bars or hold-downs and abutments that can be placed into contact with the glass sheet. Attention can be invited, for example, to DOS 1,957,601, DOS 3,428,863, U.S. Pat. No. 3,570,734, U.S. Pat. No. 3,668,995 and U.S. Pat. No. 3,253,756. A further example of an apparatus for breaking glass sheets has been described in U.S. Pat. No. 3,693,852 or EP-A-340,199.

On the glass cutting tables, the large glass sheets supplied by the glass manufacturer are scored in correspondence with the desired cuts in most cases according to an optimization determined by a computer. In this process, it is usually necessary to score so-called zero lines on the glass sheets in order to obtain defined and clean edges of the cuts located at the rims of the glass sheets.

The marginal strips of the glass sheets lying outside the zero cuts had usually been snapped off manually, and only thereafter was the actual breaking of the glass sheets begun, initially in the X direction (transversely to the conveying direction) and then in the Y direction (in the transporting direction).

The invention is based on the object of providing a process and apparatus by means of which the separation of marginal strips along the score lines corresponding to the zero lines can be integrated without problems into the conventional dividing of glass sheets and into facilities provided for this purpose.

According to the invention, this object has been attained, in a process of the type discussed above, by performing the following process steps:

Scoring of the glass sheets, producing besides the score lines defining the cuts at least two zero cut score lines oriented perpendicularly to each other in the zone of at least two rims of the glass sheet converging into a corner; conveying of the thus-scored glass sheet to a breaking table; breaking off the at least one marginal strip along the zero cutting line extending transversely to the conveying direction; dividing the glass sheet along the score lines (X cuts) extending transversely to the conveying direction; optionally further transporting the individual thus-obtained glass strips exhibiting score lines oriented in parallel to the conveying direction; breaking off the at least one marginal strip along the zero cutting line extending in parallel to the conveying direction; dividing the thus-obtained glass strips along the score lines (Y cuts) extending in the conveying direction, optionally after the glass strips have been moved to a further section of the breaking table.

Advantageous and preferred embodiments of the process according to this invention form the subject matter of the subclaims dependent on claim 1.

For performing the process of this invention, an apparatus can be utilized with a glass breaking table (optionally subdivided into several sections) following a glass cutting table and with conveying means for transporting scored glass sheets onto the glass breaking table and with devices for dividing the glass sheets along the score lines extending in the conveying direction and transversely to the conveying direction, this apparatus being characterized in that a rim snap-off tool for separating the at least one marginal strip along the score line extending perpendicularly to the conveying direction and corresponding to the zero cut is provided; that a further rim snap-off tool is provided on at least one longitudinal rim of the glass breaking table for separating the at least one marginal strip along the score line extending in parallel to the conveying direction and corresponding to the zero cut; that each of the tools for separating the marginal strips comprises an abutment that can be placed from below into contact with the glass sheet or the glass strip in the zone of the score line and two hold-downs that can be placed from above into contact with the glass sheet or the glass strip; and that the hold-down that can be engaged in the zone of the marginal strip to be separated can be lowered with respect to the other hold-down of the tool in order to twist the marginal strip to be separated.

Advantageous and preferred embodiments of the apparatus according to this invention constitute the subject matter of the subclaims dependent on claim 8.

It is possible by means of the process of this invention and the apparatus according to the invention proposed for conducting this process to separate without problems, prior to dividing ("breaking") the glass sheet along the score lines extending transversely to the conveying direction, the marginal strips with the first rim snap-off tool along the at least one score line corresponding to the zero line extending transversely to the conveying direction without interfering with the progression of the process. Thereupon, the glass sheet is divided into glass strips along the score lines extending in the X direction, and these strips are transported individually onto the part of the breaking table located downstream of the device for dividing the glass sheet (e.g. the breaking bar). The second rim snap-off tool (or, if so provided, the two rim snap-off tools) is or are actuated after a glass strip has been transported onto the second part of the breaking table in order to sever marginal strips along the portion of the score line(s) remaining on this glass strip in correspondence with the zero lines (s) extending in the conveying direction. Thereafter, the glass strip, now only carrying score lines extending in the conveying direction, is further transported and conveyed to the part of the breaking table on which the glass strip is divided along these score lines extending in the conveying direction into the individual cuts. These cuts are then carried away from the breaking table or, if provided for and necessary, are transported to a further section of the breaking table wherein the breaking step is performed along score lines extending obliquely to the conveying direction.

Figures 2, 3:
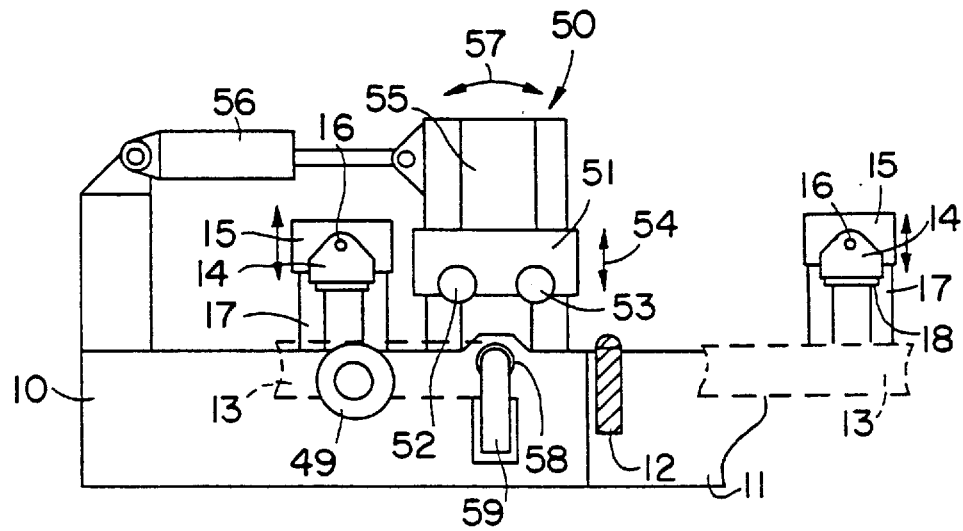
Figure 4:
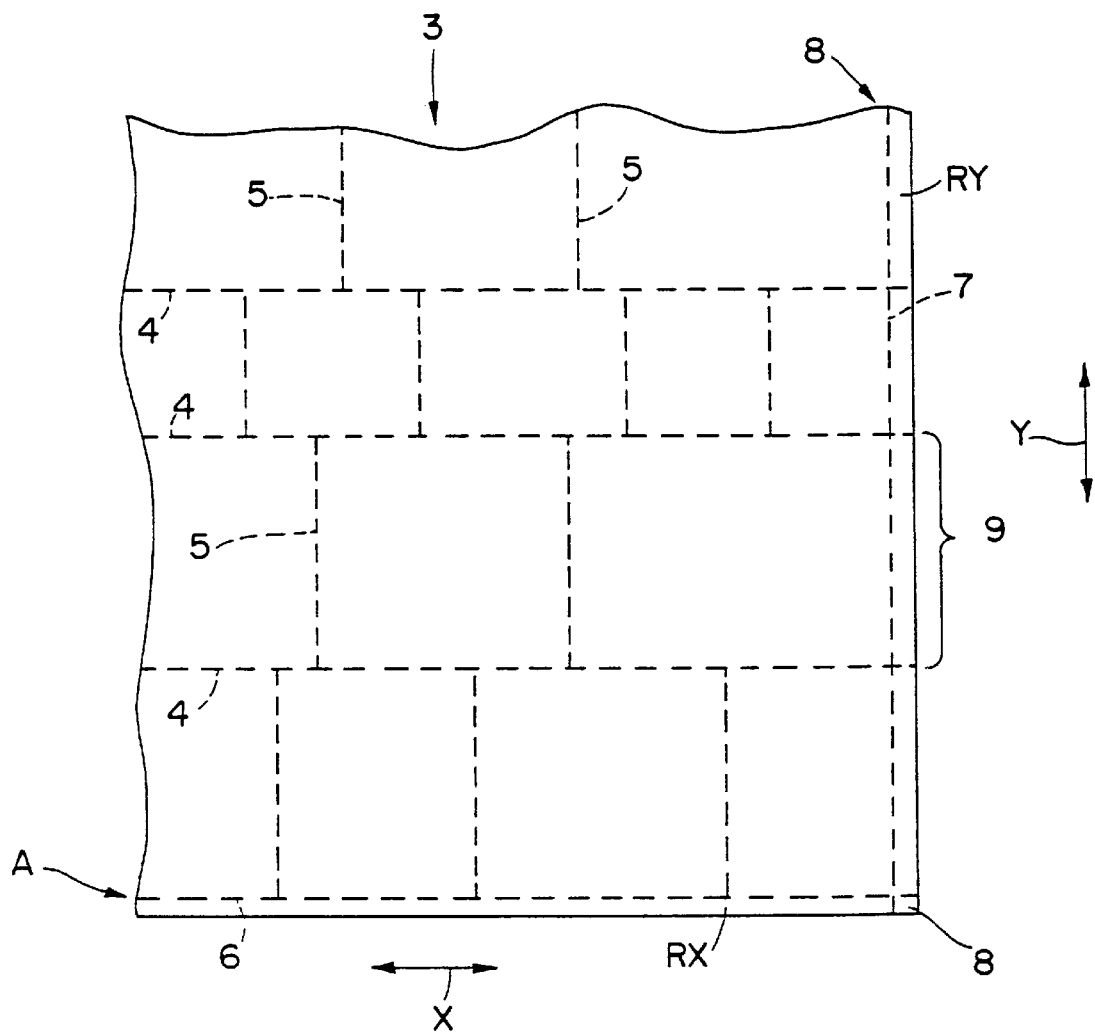
Figure 5:
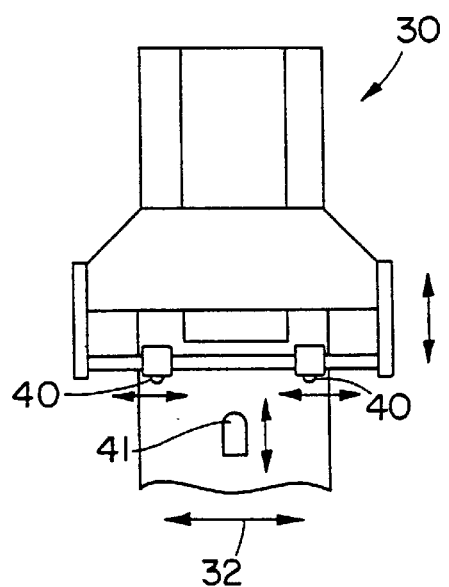
Figure 6:
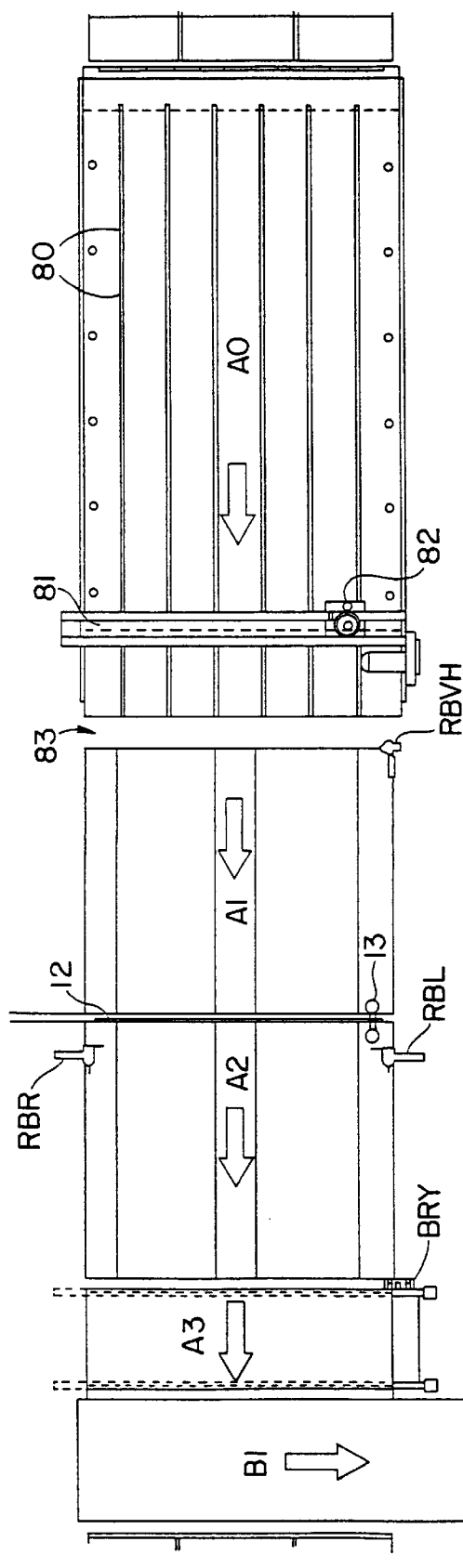
Figure 6:
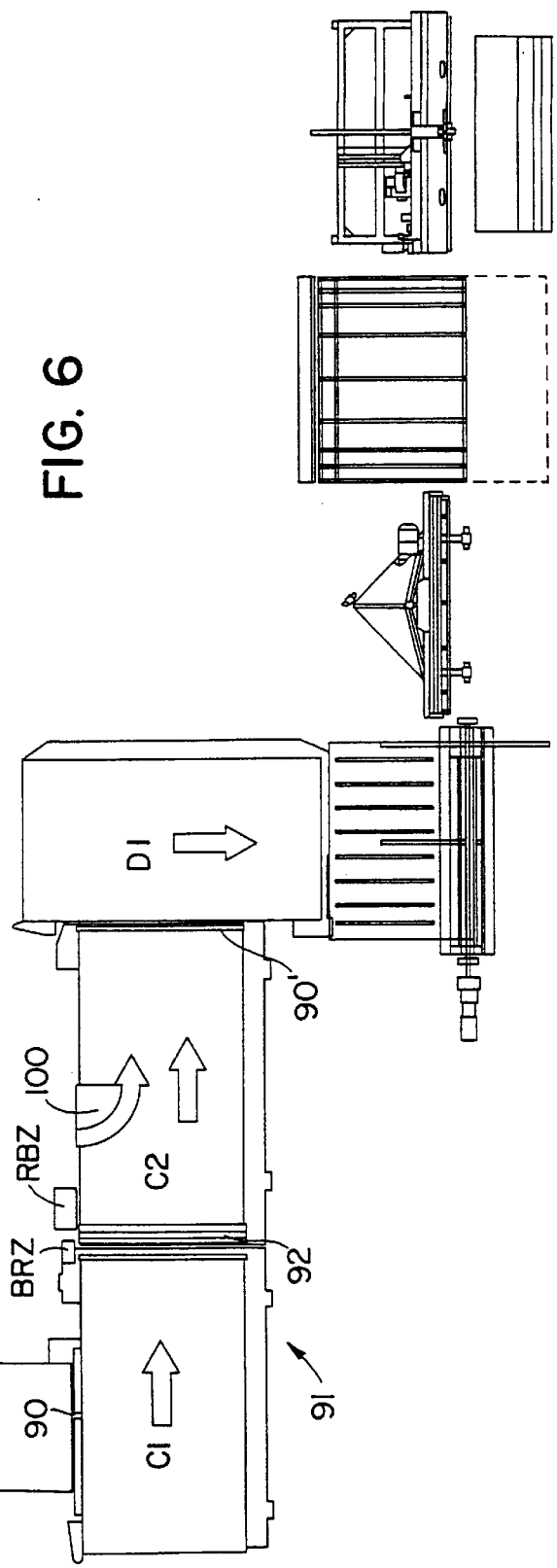
Figure 7:
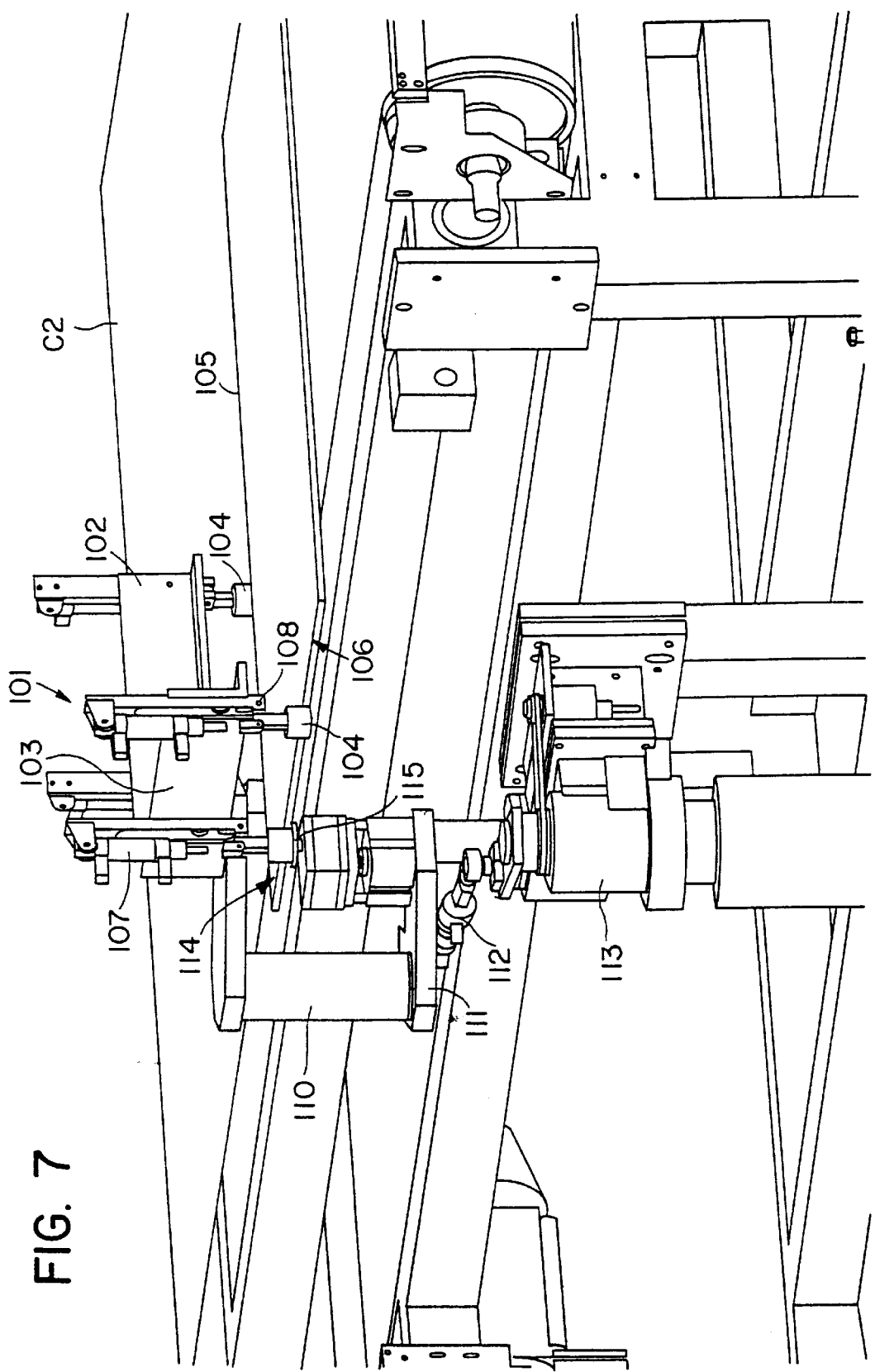
Figure 8:
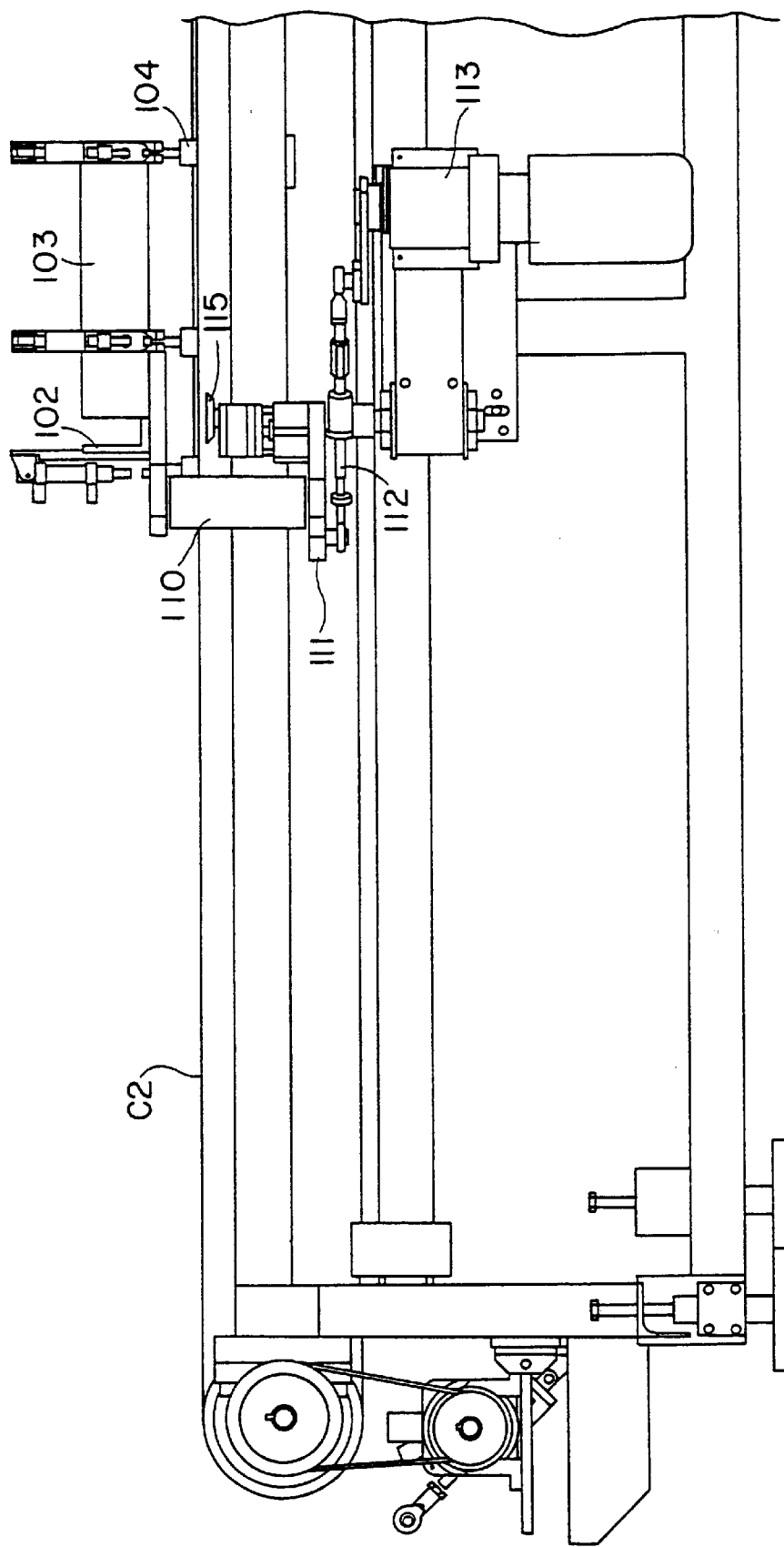

Additional details and advantages, as well as features of the process of this invention and of the apparatus according to the invention can be seen from the following description wherein reference is had to the appended drawings illustrating embodiments of the invention wherein:

FIG. 1 is a top view of a portion of a glass breaking table,

FIG. 2 shows the tool for separating marginal strips along the zero lines extending transversely to the conveying direction, seen from the breaking table, i.e. from the left-hand side of FIG. 1, FIG. 3 shows the tool for separating marginal strips along the zero lines extending in the conveying direction, seen in opposition to the conveying direction (from the bottom of the illustration of FIG. 1), FIG. 4 shows a glass sheet with score lines, FIG. 5 shows a device for breaking glass strips along score lines extending in the conveying direction, FIG. 6 shows an embodiment of a facility according to this invention for dividing glass sheets, associated on the delivery side with a device for the stacking of glass cuts, FIG. 7 shows a device for the turning of glass cuts, FIG. 8 shows the device of FIG. 7 in a lateral view, and FIG. 9 shows the device of FIG. 7 in a top view.

From a glass cutting table A0 (FIG. 6), glass sheets 3 exhibiting, for example, the arrangement of score lines 4, 5, 6 and 7 shown in FIG. 4 and produced on the glass cutting table A0 are transported in the conveying direction 2 onto the breaking table 1 shown partially in FIG. 1. In this connection, the glass cutting table, for transporting scored glass sheets 3, can have the design as disclosed in EP-B-192,920, or it can exhibit, as shown in FIG. 6, conveyor belts 80 that can be lifted above the topside of the glass cutting table A0. In addition or alternatively, the glass cutting table A0 can be fashioned as an air-cushion table.

The glass sheet 3, transported in conveying direction 2 (Y direction) onto the breaking table 1 exhibits, besides the score lines 4 extending in the X direction (transversely to the conveying direction 2) and the score lines 5 extending in the Y direction (in the conveying direction 2), also at least one score line 6 corresponding to the zero line A and extending in the X direction and a score line 7 corresponding to the at least one zero line B and extending in the Y direction, these two last-mentioned score lines meeting in a corner 8 of the glass sheet 3.

For transporting scored glass sheets 3 onto the breaking table 1 and, respectively, for supporting the conveyance when using the glass cutting table according to EP-B-192,920, the supporting surfaces 10 and 11 (A1, A2 in FIG. 6) of the glass breaking table 1 are designed as endless conveyor belts traveling in the conveying direction 2. These endless conveyor belts 10, 11 can be designed, just as all other conveyor belts (e.g. 20, 21), as air-permeable belts so that a glass sheet 3 to be processed can be fixed on these belts by the application of a vacuum through the air-permeable conveyor belt 10 or 11 (or, for example, 20, 21) to assume the desired position on the breaking table when the conveyor belt is at a standstill; or so that the glass sheets, glass strips or glass cuts can be prevented from slipping with respect to the conveyor belts during transport (especially during braking and/or accelerating) (compare here also French Patent 2,484,393 with respect to the structure of such conveyor belts).

A breaking bar 12 is provided between the two parts of the breaking table 1 formed by the conveyor belts 10 and 11 for breaking the X cuts (score lines 4); this breaking bar can be designed as known, for example, from EP-A-457,751. Thus, the breaking bar 12 can be fashioned to be higher in the zone of the rim shown in FIG. 1 which is on the left-hand side based on the conveying direction (on the right-hand side in FIG. 1) than at the other end which is not visible in FIG. 1. The breaking bar 12 thus has an upper edge which descends obliquely from the right of FIG. 1 toward the left.

Suction means 13 and hold-downs 14 operable alternatively to the former are provided for retaining the parts of the glass sheet 3 located on both sides of the breaking bar 12 while the glass sheet is divided into glass strips 9 along the score lines 4. The suction means 13 are utilized in case, for example, glass sheets 3 having a metallic coating are to be divided. It is also possible to use hold-downs of the structure known from EP-A-475,751.

The hold-downs 14 are supported to be pivotable in supports 15 about axles 16 and can be lifted and lowered by rods 17. The parts of the hold-downs 14 to be placed into contact with the glass sheet 3 are, for example, cylindrical plastic strips 18, the axes of which extend in parallel to the drawing plane of FIG. 2.

Based on the conveying direction 2 downstream of the part of the breaking table 1 formed by the conveyor belt 11, additional parts of the breaking table are arranged, constituted by a conveyor belt 20 traveling in the conveying direction 2 and by a conveyor belt 21 moving transversely to the conveying direction 2.

A free space (gap) is provided between the conveyor belt 11 and the conveyor belt 20 wherein a device 30 is located for dividing the glass strips 9 as obtained after dividing the glass sheets 3 along the score lines 4, i.e. for breaking the Y cuts (score lines 5). The device 30 is movable on a guide track 31 in the direction of the double arrow 32, i.e. in parallel to the X direction, in order to align same with respect to the score lines 5 in the glass strips 9.

In a gap 33 between the conveyor belts 20 and 21, a lifting cam 35 is disposed which is coupled with the device 30 and/or with its drive mechanism (e.g. mounted to a joint support) and thus is movable in synchronism with this device; the part 36 of this lifting cam, designed to be cylindrical with a rounded front end and consisting, for example, of a synthetic resin, can be lifted from a readiness position below the upper surface of the conveyor belts 20 and 21 into a position wherein it projects beyond this surface.

The device 30 can, for example, have the basic structure depicted in FIG. 5. The device has two liftable and lowerable hold-downs 40 which can engage the glass strip 9 to be divided from above and an abutment 41 which can engage from below in the zone of the score line 5 along which the glass strip 9 is to be divided. The hold-downs 40 as well as the abutment 41 are designed as cylindrical plastic strips contacting with a generatrix the topside and, respectively, underside of the glass strips 9.

The mutual spacing of the hold-downs 40 is variable so that the forces acting on the glass strip 9 can be changed. In this connection, in case of a relatively thick glass, the mutual distance of the hold-downs 40 is chosen to be larger than in case of relatively thin glass.

During breaking of glass strips 9 with the aid of the device 30, the abutment 41 is lifted past the surface of the conveyor belt 20 in order to thus achieve a secure course of the break along the score line 5. Also the extent of lifting the abutment 41 past the topside of the conveyor belt 20 while breaking a Y cut (score line 5) is selected in dependence on the thickness of the glass. In case of relatively thick glass, the lifting stroke is shorter than in case of relatively thin glass.

The lifting cam 35 arranged in the slot 33 between the conveyor belts 20 and 21 is, of course, effective only if the score line 5 along which a glass strip 9 is to be divided extends up onto the conveyor belt 21.

As already indicated hereinabove, tools 50 and 60 for snapping off the marginal strips RX and RY (FIG. 4) are provided at the breaking table 1. In this arrangement, the tool 50 is intended for breaking off the marginal strip RX along the score line 6 corresponding to zero line A which can be provided at the rim of the glass sheet 3 that is at the front and/or at the rear, as seen in the conveying direction 2, whereas the rim snap-off tool 60 serves for separating the portions of marginal strips RY remaining at the glass strip 9 (marginal strips RY can be provided on one or on both lateral rims of the glass sheet 3) along the score line 7 corresponding to the zero line B.

The rim snap-off tool 50 has, for example, the structure shown in principle in FIG. 2. Two hold-down cleats 52, 53 (cylindrical parts of an elastic synthetic resin) are arranged at a support 51. These hold-down strips 52, 53 can be brought into contact with the glass sheet 3 by an upward and downward movement of their support 51 (arrow 54) on both sides of the score line 6. The part 55 of the rim snap-off tool 50 along which the support 51 is displaceably guided is pivotable with the aid of a pressure medium motor 56 in the machine frame in the direction of the double arrow 57 about an axis in parallel to the score line 6. The rim snap-off tool 50 furthermore has an abutment 58 likewise designed as a plastic cylinder and mounted to the free end of a lever-shaped support 59. By pivoting the lever 59 with the aid of a pressure medium motor, not shown, about an axis extending approximately in parallel to the conveying direction 2, the abutment 58 can be placed into contact with the glass sheet 3 from below in the region of the score line 6.

For snapping off a marginal strip RX, the abutment 58 and the two hold-downs 52 and 53 are placed in contact with the glass sheet 3 from both sides (from the bottom and, respectively, from the top) and then part 55 of the rim snap-off tool 50 is pivoted by operating the pressure medium motor 56 so that the hold-down 53 adjacent the rim of the glass sheet 3 and in contact with the marginal strip RX moves downwards with respect to the other hold-down 52, and the marginal strip RX is twisted. During this step, the glass sheet 3 breaks along the score line 6, and the marginal strip RX is separated from the glass sheet 3 over the entire width of the latter. The degree of pivoting of the part 55 of the rim snap-off tool 50 can be selected in dependence on the width of the glass sheet and its thickness and ordinarily is chosen to be larger in case the score line 6 is longer.

A rotatable cylinder or roller 49, mounted fixedly to the machine frame, is furthermore arranged in the zone of the rim snap-off tool 50, the glass sheet 3 or, respectively, its rim adjacent to the rim snap-off tool 50 being guided and supported on this cylinder or roller, since this rim is transported in the direction of arrow 2 (FIG. 1) while projecting beyond the lateral rim of the parts of the glass breaking table 1 constituted by the conveyor belts 10 and 11 or, in case felt faces are furthermore located beside the conveyor belts 10 and 11, projecting beyond these felt faces.

After the marginal strip RX has thus been separated, the glass sheets 3 are divided along the score lines 4 into individual glass strips 9 (breaking of the X cuts) by operating the lifting bar 12.

The individual glass strips 9 are moved on by moving the conveyor belt 11 until the rim of the glass strip 9 that is at the rear based on the conveying direction 2 is aligned with respect to the rim snap-off tool 60 meant for severing the marginal strips RY. This tool, by operating the pressure medium motor 70, is adjusted on a guide rail 72,affixed to the machine frame and guiding the frame of the rim snap-off tool 60, transversely to the conveying direction 2 until it is oriented in such a way that the abutment 68 is located exactly underneath the score line 7. At this point, the abutment 68 is placed into contact with the glass strip 9 from below by pivoting the lever 69, and the tool part 65 after applying the hold-downs 62, 63 is pivoted by operating the pressure medium motor 66 in the direction of the double arrow 67 in order to twist the marginal strip RX and sever same from the glass strip 9.

After this has been accomplished, the rim snap-off tool 60 is moved back into its readiness position farther removed from the conveyor belt 11 and, respectively, the rim of the breaking table 1 (double arrow 73) by a corresponding operation of the pressure medium motor 70.

The thus-obtained glass strips 9 without marginal strips RX and RY are moved by the traveling conveyor belt 11 onto the part of the breaking table 1 formed by the conveyor belts 20 and 21; at this point in time, the device 30 used for breaking the Y cuts (score lines 5) is outside of the range of the glass strips 9 to be fed, by having been adjusted on its guide track 31.

After the glass strips 9 have been divided into cuts with the aid of the device 30 by having been broken along the score lines 5, the thus-produced cuts are carried away from the breaking table 1 by a corresponding movement of the conveyor belts 20 (in the conveying direction 2) and 21 (transversely to the conveying direction 2) and are passed on to further use.

A facility according to the invention for dividing glass sheets 3 will be described below with reference to FIGS. 6–8, as another embodiment:

The glass cutting facility consists of a glass cutting table A0, the top of which is designed as an air-cushion table, several liftable and lowerable conveyor belts 80 being provided in this top and extending in the conveying direction 2. A conventional cutting bridge 81 with cutting head 82 is mounted at the glass cutting table A0 to be movable in the Y direction, the cutting head 82 being movable on the cutting bridge 81 in the X direction.

Following the glass cutting table A0, a rim snap-off device RBVH is provided at one end of an interspace 83 between the delivery end of the glass cutting table A0 and a conveyor table A1 with two parallel-traveling conveyor belts corresponding to the conveyor belt 10 of FIG. 1. The structure and function of the rim snap-off device correspond to those of the device 50 according to FIG. 2. This rim snap-off device RBVH serves for breaking off marginal strips RX at the forward and optionally also rearward end of a glass sheet 3.

In the region of the interspace 83, a collecting trough (not illustrated) for severed marginal strips RX is arranged underneath the glass cutting table A0 and the conveying table A1.

Between the sections A1 and A2 of the conveying table (corresponding to the conveyor belts 10 and 11 of FIG. 1), the breaking bar 12 is provided with the hold-downs 13, here designed as suction means, in order to divide the glass sheet 3 along the score lines 4 into glass panes 9 (breaking of the X cuts).

Two rim snap-off devices RBR and RBL are associated with the beginning of the conveying table A2 which serve for severing marginal strips RY from the right-hand and/or from the left-hand rim of the glass strips 9. The rim snap-off devices RBR and RBL, respectively, have a structure and function corresponding to the rim snap-off device 60 as illustrated in FIG. 3 and described hereinabove.

The conveyor belts of the conveying tables A1, A2 can be designed, just as the conveyor belts 10 and 11 of the glass breaking table 1 of FIG. 1, as suction conveyor belts so that the glass sheet or the glass strips 9 can be securely fixed in position during execution of the breaking step and, if desired, transport can be performed without slippage of the glass sheets 3 or, respectively, the glass strips 9 with respect to the conveyor belts.

On both sides of the conveying table with its sections A1 and A2, collecting troughs are arranged for marginal strips severed from glass strips 9 by the rim snap-off device RBR or RBL, respectively.

Following the conveying tables A1, A2, a conveying table A3 is arranged corresponding to the conveying table 20 of FIG. 1. A device BRY for breaking the glass strips along the score lines 5 (breaking of the Y cuts) is associated with the rim of the conveying table A3 that is at the front based on the conveying direction 2; the structure and function of this device correspond to those of the breaking unit 30 of FIG. 5. The lifting cam 35 (not shown in FIG. 6) associated with the breaking device BRY is located in a gap between the conveying table A3 and the subsequently arranged conveyor belt B1 corresponding to the conveyor belt 21 of FIG. 1.

Another conveying table 91 is associated with the delivery end of the conveying table B1 and is subdivided into two sections C1 and C2, transporting the glass cuts to a location of the facility wherein the glass cuts can be divided along obliquely oriented score lines likewise contained in these cuts (breaking of the Z cuts). In order to ensure transfer from the conveying table B1 to the conveying table section C2, i.e. to make sure transport of the glass cuts proceeds without any problems, the conveying table B1 is designed to be vertically movable, and a roller 90 that can be lifted and lowered with the table is provided at the table delivery end. The device for breaking the Z cuts, denoted by BRZ in FIG. 6, has a structure and function like the device BRY or 30 for breaking the Y cuts.

In order to permit easy alignment of the score lines corresponding to the Z cuts that may be provided in cut-to-size glass with respect to the device BRZ between the sections C1 and C2 of the conveying table 91 (for this purpose, the glass cuts must be turned in a horizontal plane), the conveyor belts of sections C1 and C2 can be designed as air-permeable belts which can be exposed not only to a vacuum but also to excess pressure so that they act as air-cushion tables.

Downstream of the breaking device BRZ based on the conveying direction, still another rim snap-off device RBZ is provided by means of which marginal strips or other remainders can be snapped off along Z cuts. This rim snap-off device RBZ has a structure corresponding to that of the rim snap-off device RBVH and, respectively, the rim snap-off device 50 of FIG. 1.

In the zone of the interruption between sections C1 and C2 of the conveying table 91, several downwardly pivotable rollers or cylinders 92 (roller field) are furthermore mounted at section C2, swung downwards upon operation of the rim snap-off device RBZ so that separated glass parts can drop into a collecting trough arranged between sections C1 and C2 of the conveying table 91.

A device 100 for turning glass sheet cuts is also associated with the section C2 of the conveying table 91.

The device 100 for turning glass cuts is shown in greater detail in FIGS. 7–9.

The device 100 for turning glass cuts serves for turning the glass cuts resting on section C2 of the conveying table 91 in such a way that they are fed to the subsequently provided conveying table D1 (delivery conveyor) for a correctly aligned transfer to a device, connected after the facility, for the uptilting and stacking of glass cuts; this last-mentioned device is indicated schematically in FIG. 6 and can have a structure according to EP-A-477,163. In this connection, it is preferred to feed the glass cuts, in case relatively small cuts are involved, from the delivery conveyor D1 to the stacking device with their longer lateral edge leading. The stacking device comprises a means for the upward tilting of the glass cuts, arranged beside the delivery end of the delivery conveyor D1; this means can exhibit, for example, the structure of the device 60 in FIGS. 5 and 6 of EP-A-477,163; following this means, a device is provided for lowering glass cuts, having a structure corresponding to device 70 of FIG. 5 in EP-A477,163, and subsequently to this device, a rack-equipped cart is arranged as likewise illustrated in FIGS. 5 and 6 (reference numeral 80) of EP-A477,163. As for additional details of construction and mode of operation of this stacking device, attention is invited to EP-477,163.

The device 100 for turning the glass cuts on the conveying table section C2 comprises an angle lever 101, respectively two stops 104 being mounted to the legs 102, 103 thereof; as can be seen from FIG. 7, these stops can be placed into contact with two rims 105, 106, converging in a corner, of a glass sheet cut. In order to be able to remove the stops 104 from their effective position according to FIG. 7, they or, respectively, their supporting arms can be folded upwards at the angle lever 101 about pivoting axles 108 with the aid of pressure medium motors 107.

The angle lever 101 is supported in the machine frame by way of a mounting 110 having essentially a U-shape design to be pivotable about an axis perpendicular to the supporting surface of the conveying route section C2, this axis being located in the region of one of the rims of this conveyor belt section C2. For this purpose, a thrust arm 112 coupled to a motor 113 engages at a lower section 111 of the mounting 110.

Advantageously, a suction cup 115 can be provided at the mounting 110 and thus turnable therewith; this suction cup can be applied to the underside of the glass cut in the zone of the corner 114 thereof located in the region of the pivot axis. The suction cup 115 serves for retaining the glass cuts in the region of their corner 114 while being turned by the angle lever 101, the stops 104 of which are in contact with the rims 105 and 106 of the glass cut. During this step, the conveying route section C2, the conveyor belt of which is fashioned to be air-permeable, can be acted upon by compressed air so that the section C2 acts as an air-cushion table, and friction between the conveyor belt and the glass cut during turning of the latter is reduced.

The turning device 100 is advantageously arranged in accordance with FIGS. 7–9 so that the suction cup 115 is located in the region of a laterally open recess of the conveying table section C2 so that the glass cut, while being turned, is supported thereby over a maximally large surface area.

In summation, the invention can be described as follows, for example:

A lifting bar 12 for breaking scored glass sheets along score lines extending in the X direction and a device 30 for breaking the glass sheets along score lines extending in the Y direction are provided at a glass breaking table 1, conveyor belts 10, 11, 20, 21 being included in order to transport the scored and/or partially broken glass sheets to the various locations of the glass breaking table 1.

Additionally, rim snap-off tools 50 and 60 are associated with the glass breaking table 1; these tools snap off marginal strips located outside of score lines corresponding to zero lines by twisting these marginal strips with respect to the glass sheet. The procedure herein is such that first of all the marginal strips extending in the X direction are broken off by the rim snap-off tool 50 before the glass sheet is broken along the score lines extending in the X direction. Then, additional marginal strips located along the zero score lines extending in the Y direction are broken off the individual thus-obtained glass strips by means of rim snap-off tools 60. Only thereafter are the glass strips divided into the desired glass cuts along the score lines extending in the Y direction, and are carried away by the conveyor belt 21 of the glass breaking table 1.

What is claimed is:

1. A method of separating a marginal strip at an edge of a glass sheet along a score line with a snap-off tool that has an abutment below the glass and two hold-downs carried by a pivotable part that is above the glass sheet and pivotable about an axis, the method comprising the steps of:

changing a positional relationship of said scoreline and said abutment from a first position where said scoreline is not in alignment with said abutment to a second position where said scoreline is in alignment above said abutment and said two hold-downs are above said glass sheet straddle said scoreline, moving the abutment vertically up into contact with the glass sheet;

moving the pivotable part vertically down until both hold-downs contact the glass sheet, one of the two hold-downs contacting the marginal strip and the other hold-down contacting a section of the glass sheet other than the marginal strip; and applying a pivoting force to a point on the pivotable part, said point being spaced above the two hold-downs and spaced above the axis to move the one of the hold-downs that is in contact with the marginal strip down relative to the other to twist the marginal strip relative to the remaining portion of the glass sheet, wherein the applied force is sufficient to break off the marginal strip of the glass sheet.

2. The method of claim 1, wherein the snap-off tool straddles an edge of the glass sheet and the score line is generally perpendicular to the edge of the glass sheet, and wherein the step of aligning and straddling comprises the step of moving the snap-off tool along the edge of the glass sheet.

3. The method of claim 1, wherein the abutment and the two hold-downs are cylindrical rods, and wherein the step of moving the abutment and the hold-downs into contact with the glass sheet comprises the step of aligning longitudinal axes of the cylindrical rods parallel with the score line.

* * * * *